United States Patent Office 3,434,964
Patented Mar. 25, 1969

3,434,964
REMOVING NITROGEN FROM
HYDROCARBON OILS
Julius Philip Bilisoly and James Bryan Zachry, Baton Rouge, La., assignors to Esso Research and Engineering Company, a corporation of Delaware
No Drawing. Filed June 27, 1966, Ser. No. 560,890
Int. Cl. C10g 23/02; B01j 11/74, 11/32
U.S. Cl. 208—254                    11 Claims

ABSTRACT OF THE DISCLOSURE

Nitrogen compounds are removed from hydrocarbon oils by contacting the hydrocarbon oil in the presence of feed hydrogen with a catalyst of cobalt or nickel molybdate, or sulfided cobalt or nickel molybdate, supported on alumina or an alumina-silica mixture which has been prepared by adding aqueous hydrogen fluoride to an alumina or alumina-silica hydrosol, causing the hydrosol to set to the corresponding hydrogel.

---

This invention relates to a method of preparing a new catalyst and a process of treating hydrocarbons using such a catalyst.

More particularly, the invention relates to an improved type of catalyst of increased efficiency in the removal of nitrogen compounds from petroleum distillates including those having nitrogen which is extremely difficult to remove. The catalyst comprises sulfided nickel and molybdenum or sulfided cobalt and molybdenum on alumina. The alumina is formed from alumina hydrosol or mixed silica-alumina hydrosols gelled by an aqueous hydrogen fluoride treatment before applying the nickel, cobalt and molybdenum compounds. The alumina hydrosol or the silica-alumina hydrosol mixture is mixed to get a homogeneous mixture which is then set to a hydrogel by a weak aqueous hydrogen fluoride solution.

Thereafter the hydrogel is dried and then has the nickel or cobalt and molybdenum compounds added by means of an aqueous impregnating solution. The dried impregnated gel is calcined to transform the nickel and molybdenum to oxide form and then sulfided.

The catalysts of the present invention were used for removing nitrogen compounds from gas oil and shale oil and were found to be about 40% more active than a commercial cobalt molybdate-alumina catalyst for denitrogenation of gas oil and 100% more active than the same commercial catalyst for denitrogenation of a shale oil distillate. The activity maintenance and regenerability of the catalyst of the present invention are good.

The present invention describes a new method for the preparation of a new cobalt molybdate or nickel molybdate on a high quality or pure alumina support such as alumina made by hydrolyzing an aluminum alcoholate, and also the preparation of nickel molybdate or cobalt molybdate on a silica stabilized alumina support. In each case the alumina support or silica stabilized alumina support is formed from an alumina hydrosol conveniently obtained by rehydrolyzing an alumina trihydrate (spray-dried product from the hydrolysis of aluminum alcoholate), and an alumina-silica hydrosol obtained by mixing such an alumina hydrosol with a silica hydrosol conveniently obtained by passage of a sodium silicate solution through a cation exchange resin. The alumina hydrogel or alumina-silica hydrogel is formed by treating the wet hydrosols with hydrogen fluoride (HF) in aqueous solution.

The resulting mixture is dried and calcined then impregnated with the cobalt or nickel and molybdenum salts in aqueous solution to produce the catalysts of the present invention which are more active hydrodenitrogenation catalysts than commercial or conventional catalysts now in use. The catalysts are sulfided before use.

The heart of the invention is that active supports for metal impregnation are prepared by precipitating or forming as a hydrogel a high quality of pure alumina such as one made from aluminum alcoholate or silica stabilized alumina from their solution as hydrosols by treatment of the wet hydrosols with aqueous hydrogen fluoride to effect setting to a hydrogel. It is essential to treat the alumina hydrosol or silica hydrosol in the wet state with aqueous HF solution. The prior art shows HF treatment of dried supports or dried catalysts, but such processes do not produce the new and better results produced by the catalysts of the present invention.

The catalysts prepared according to the present invention are especially useful in the treatment of shale oil distillates which are extremely difficult to denitrogenate. The shale oil distillates are more difficult to denitrogenate than coker gas oils which are more difficult to denitrogenate than conventional gas oils.

With the present invention, aqueous HF solution is used to set an alumina hydrosol to a hydrogel or to set a homogeneous mixture of $Al_2O_3$ and $SiO_2$ hydrosols (wet), thereby obtaining ideal cogellation of the silica and alumina to form a support. The support is impregnated with cobalt or nickel and molybdenum compounds. The impregnated support is then treated to produce the desired catalyst.

EXAMPLE 1

In one example 535 grams of spray-dried alcoholate alumina having a solids content of 67.3% and therefore equivalent to 360 g. of dry $Al_2O_3$, was dissolved in distilled water to give 12,000 ml. of 3% $Al_2O_3$ hydrosol. An approximately 3% by weight $SiO_2$ hydrosol was prepared by passing a 1.030 specific gravity sodium silicate ($Na_2O:3.25\ SiO_2$) solution downward through a cation exchange column of resin thereby producing an approximately 3% $SiO_2$ hydrosol of about 3.0 pH.

1334 ml. of the 3% $SiO_2$ hydrosol prepared as mentioned above were added with stirring to the prepared $Al_2O_3$ hydrosol contained in a 5 gallon earthenware crock. The homogeneous mixture was then set to a hydrogel by the addition of a 200 ml. aqueous solution of 81.5 g. C.P. 49% hydrogen fluoride (HF) (approximately 20% HF solution). The HF dosage was 10% by weight of the combined $SiO_2$ and $Al_2O_3$. The pH of the resulting solution was lowered and this not only effected setting of the mixture to a hydrogel mass but also imparted desirable acidic qualities essential to the catalyst for use in the process for removing nitrogen compounds from the oil distillate. The hydrogel was then slowly dried at 220° F. for about 16 hours.

Then 523 g. of the 220° F. dried carrier (23.6% volatile content) were impregnated with an aqueous solution of 222.5 g. of $Ni(NO_3)_2 \cdot 6H_2O$ and 140.2 g. of $$(NH_4)_6Mo_7O_{24} \cdot 4H_2O$$

of approximately 81.5% $MoO_3$ content. In preparing the impregnating solution, the two ingredients were separately dissolved in minimum amounts of distilled water and then mixed to a total volume of 575 ml. which was such that the total volume of solution was adsorbed by the dried carrier in the impregnation step. The catalyst was then dried at 220° F.

The resulting catalyst had the following composition:

| Percent | | Grams | |
|---|---|---|---|
| $Al_2O_3$ | 63.0 ⎫ 70 | $Al_2O_3$ | 360.0 |
| $SiO_2$ | 7.0 ⎭ | $SiO_2$ | 40.0 |
| NiO | 10.0 | NiO | 57.15 |
| $MoO_3$ | 20.0 | $MoO_3$ | 114.30 |
| | 100.0 | | 571.45 |

The catalyst composition contained 2.4 wt. percent equivalent of HF.

Before use the catalyst prepared according to the process of the present invention was calcined and sulfided in all cases to convert the nickel, cobalt and molybdenum oxides substantially all to the sulfides.

This catalyst is designated "A."

EXAMPLE 2

An additional large batch was made by using approximately 6.3 times the reagent quantities used in Example 1. Some slight variations were made in the procedure because of the quantities involved, however, the nominal composition of the catalyst was:

| | Percent |
|---|---|
| $Al_2O_3$ | 63 |
| $SiO_2$ | 7 |
| NiO | 10 |
| $MoO_3$ | 20 |
| | 100 |

The catalyst composition contained 2.4 wt. percent equivalent of HF.

Like Example 1 the silica-alumina hydrogel was set by treatment with 20% aqueous hydrogen fluoride solution.

In the actual preparation 3305 g. of alcoholate alumina, equivalent to 2263 g. $Al_2O_3$, dry basis, were dissolved in 165 pounds of water heated to 140–160° F. (to facilitate solution) in a plastic drum. Two pounds of cation exchange resin were slurried in 2 liters of water in a 3-gallon plastic drum. To this were added 7333 ml. of a solution of N-brand sodium silicate (containing 280 g. equivalent of $SiO_2$). The mixing was continued until the liquid was acid to methyl orange. About 8400 ml. (equivalent to 251.6 g. of $SiO_2$) of the clear silica hydrosol were withdrawn.

With rapid stirring the 8400 ml. of the $SiO_2$ hydrosol were added to the alumina hydrosol and the stirring was continued for 5 minutes. Then slowly added was a 1250 ml. aqueous solution of 574 g. of 49% HF. This is the equivalent of 10 wt. percent HF based on the combined alumina and silica. The mixture immediately set to a soft hydrogel which was oven dried at 220° F. over a period of 16 hours and yielded 3206 g. (2310 g. dry basis). The addition of the aqueous HF solution to the mixed $$SiO_2-Al_2O_3$$

hydrosol set the homogeneous mixture to a hydrogel and ideal coprecipitation and treatment were obtained.

All of the oven dried mixture was impregnated with a mixed aqueous solution prepared as follows:

1400 g. of $Ni(NO_3)_2 \cdot 6H_2O$ (equivalent to 359 g. of NiO) were dissolved in water to make 1400 ml. solution. Then 876 g. of the same ammonium molybdate as above described (equivalent to 718 g. of $MoO_3$) were dissolved in warm water (to promote solution) to make 1120 ml. solution and added with stirring to the solution of nickel nitrate. After cooling to room temperature, 2310 ml. of the mixed solution were used for the impregnation step.

In the impregnation step, the total volume of liquid was adsorbed by the silica-alumina gel carrier which was then oven dried at 220° F.

This catalyst is designated "B."

In other catalyst compositions the amount of $SiO_2$ may vary up to 40% of the $Al_2O_3$-$SiO_2$ portion of the dried composition. The amount of $SiO_2$ in the catalyst can be between 1 and 34 weight percent and the amount of $Al_2O_3$ in the catalyst can be between 30 and 84 weight perecent. The $Al_2O_3$-$SiO_2$ amount or portion may vary between 60 and 85% of the total catalyst. The NiO in the catalyst may vary between 3 and 15% by weight and the $MoO_3$ by weight may vary between 12 and 25%. The CoO content of the catalyst may vary between 1.0 and 10 wt. percent. The hydrogen fluoride treatment to effect setting of the silica-alumina hydrosol and to increase acidity may vary between 0.5 and 10% by weight of the $$SiO_2-Al_2O_3$$

content.

EXAMPLE 3

Catalyst "A" was pelleted and heat treated or calcined in air at 1000° F. for about 16 hours. The catalyst was then sulfided as follows: The catalysts were heated to 400° F. in a nitrogen atmosphere. At 400° F. the catalysts were treated with 10 vol. percent hydrogel sulfide in hydrogen at the rate of 2.85 v./v./hr. at atmospheric pressure for a period of 2 hours, then further treated under the same conditions while increasing the catalyst temperature 50° F. per hour up to 800° F. The sulfiding was continued at 800° F. for 2 additional hours. The reactors were then pressured with hydrogen to the desired operating pressure and the temperature was adjusted to the desired operating temperature.

The sulfided catalyst was used in the nitrogen removal of a gas oil of 430–750° F. boiling range at unit testing conditions of 650° F. reactor temperature and 1500 p.s.i.g. pressure, 0.7 v./v./hr. feed rate, and 5000 cubic feet of $H_2$ per barrel of oil feed. The initial nitrogen content of the oil feed of 750 p.p.m. (parts per million) was reduced to 5 p.p.m. representing a reduction of 99.3%. The nitrogen is usually removed as ammonia.

EXAMPLE 4

The activity of catalyst "A" for denitrogenation was compared to that of a standard type cobalt molybdate on conventional alumina support (CoO 3.5%; $MoO_3$ 12.5%; $Al_2O_3$ 84%) and was about twice that of the standard cobalt molybdate catalyst above mentioned under the same conditions and after 900 hours of continuous operation under the conditions described above.

The $SiO_2$-$Al_2O_3$ hydrogel may be dried at a temperature of 220 to 350° F. for 2 to 16 hours. The dried hydrogel may be calcined at a temperature of 1000° F. to 1200° F. for a time between 6 and 16 hours.

Catalysts prepared according to the present invention are also more active than commercial cobalt molybdate-alumina catalysts for removing nitrogen from shale oil. The activity maintenance and regenerability of the catalysts are good.

EXAMPLE 5

Catalyst "A" was used in a screening test and found to be about twice as active as conventional cobalt molybdate on alumina catalyst described in Example 4 for the hydrodenitrogenation of shale oil distillate. The test was carried out at 800° F., 800 p.s.i.g. 5000 s.c.f./b. of hydrogen using 70% overhead shale oil distillate at 1 w./hr./w. The 70% overhead shale oil had the following inspections:

Table I

| | |
|---|---|
| Gravity, °API | 23.4 |
| Sulfur _____wt. percent | 0.88 |
| Nitrogen _____wt. percent | 1.80 |

Distillation: Volume percent
- 430–650° F. _____ 35
- 650–850° F. _____ 50
- 850–1000° F. _____ 15

Catalyst: Product N, wt. percent
- Conventional _____ 0.93
- "A" _____ 0.45

EXAMPLE 6

Catalyst "A" was used for the removal of nitrogen from a high end point feed containing 43% of a 1050° F. end point coker gas oil and 57% of 500–760° F. catalytic cycle oil. The oil feed blend is given in the following Table II:

Table II.—Heavy oil feed: 43% (1050° F. E.P. coker gas oil); 57% (catalytic cycle oil)

| | |
|---|---|
| Gravity, °API | 16.5 |
| Sulfur _____wt. percent | 3.0 |
| Nitrogen _____p.p.m. | 1820.0 |
| 90% Pt °F. | 949.0 |

A comparison of the required hydrofining temperatures is shown below in Table III for other blended feeds containing the catalytic cycle oil but different amounts of coker gas oils of different end points.

TABLE III

[Reactor temperature required for 40 p.p.m. product nitrogen (at 0.7 v./v./hr., 1,500 p.s.i.g., 8,000 s.c.f./b. $H_2$ (95%))]

| Feed stock | | | |
|---|---|---|---|
| Coker component | | Blended feed $N_2$ content, p.p.m. | Required reactor, Temp., °F. |
| Vol. percent | End point, °F. | | |
| 23 | 750 | 750 | 630 |
| 36 | 900 | 1,150 | 690 |
| 43 | 1,050 | 1,820 | 740 |

As expected, the reactor temperature required to produce a 40 p.p.m. nitrogen product increased with the increasing end point of the coker component.

EXAMPLE 7

Tests were made using catalyst "B" of Example 2 and conventional cobalt molybdate as described above in Example 4 with a 700–1050° F. medium vacuum gas oil feed. Little or no deactivation of catalyst "B" was observed during 200 hours of testing at severe hydrofining conditions of 750° F. and 1500 p.s.i.g. The data in Table IV illustrate the superior denitrogenation capabilities of the catalysts of the present invention. The feed contained 1285 p.p.m. of nitrogen. The space velocity was 1.0 v./v./hr. and 3000 s.c.f. $H_2$/b. were supplied. The catalysts were presulfided.

TABLE IV

| | Temperature, °F | |
|---|---|---|
| | 700 | 750 |
| | Nitrogen, p.p.m. | |
| (1) $CoMoO_4/Al_2O_3$, conventional | 335 | 195 |
| (2) Catalyst "B" | 160 | 25 |

In these tests the catalysts were presulfided in Example 7 as follows: The catalysts were heated to 400° F. in a nitrogen atmosphere. At 400° F. the catalysts were treated with 10 vol. percent hydrogen sulfide in hydrogen at the rate of 285 v./v./hr. at atmospheric pressure for a period of 2 hours, then further treated under the same conditions while increasing the catalyst temperature 50° F. per hour up to 800° F. The sulfiding was continued at 800° F. for 2 additional hours. The reactors were then pressured with hydrogen to the desired operating pressure and the temperature was adjusted to the desired operating temperature.

It is clear from the above results that the superior denitrogenation activities of the catalysts of the present invention are produced with the HF treated $SiO_2$ stabilized $Al_2O_3$ base in a wet precipitation or gelling step.

EXAMPLE 8

The feed such as used in Example 6 containing 43% of 1050° F. end point coker gas oil was hydrodenitrogenated over both a conventional cobalt molybdate on silica stabilized $Al_2O_3$ catalyst (3% CoO, 15% $MoO_3$, 4% $SiO_2$ and 78% $Al_2O_3$) and catalyst "B" in separate reactors. Both catalyst charges remained from a previous run on the same type of feed and had not been regenerated or resulfided. A check run with the feed showed no significant activity loss so the results were considered consistent with fresh catalysts.

The conventional cobalt molybdate catalyst had been sulfided with the same feed described in Example 7. The feed contained 1820 p.p.m. of nitrogen at 500° F. The catalyst had shown a relative activity of 85% in the previous run. (Cobalt molybdate catalyst on $SiO_2$ stabilized alumina has a comparable activity of 100% after treatment with the 10% hydrogen sulfide in hydrogen sulfiding procedure. Catalyst "A" had been sulfided by the same 10% hydrogen sulfide in hydrogen procedure and had shown a relative activity of 140%.)

For the first part of the run the two reactors were operated at 1500 p.s.i.g., 0.7 v./v./hr., 8000 s.c.f./b. of $H_2$ and 700° F. The nitrogen content was reduced from 1820 p.p.m. to 150 p.p.m. by the conventional cobalt molybdate catalyst and to about 40 p.p.m. by catalyst "A."

During the operation the activity of catalyst "A" was 170% of the activity of the conventional cobalt molybdate catalyst with both feeds being the same high end point stock. Since the original relative activity of the conventional cobalt molybdate catalyst was only 85%, the relative activity of catalyst "A" of the present invention on heavy feed was about 145%. The lower temperature requirement of catalyst "A" is particularly useful with heavy feeds.

The following Table V gives additional data using the blended feedstock of Table II. The conventional catalyst is designated "C–C" and contained 3% CoO, 15% $MoO_3$, 4% $SiO_2$ and 78% $Al_2O_3$.

TABLE V

[Feed and product inspections operation at 0.7 v./v./hr., 1,500 p.s.i.g., 8,000 s.c.f./b. of $H_2$ (95%)]

| | Blended feedstock | Hydrofiner product | |
|---|---|---|---|
| | | Catalyst C–C | Catalyst "B" |
| Operating temp., °F | | 706 | 703 |
| Inspections: | | | |
| Gravity, °API | 16.5 | 27.5 | 28.3 |
| Nitrogen, p.p.m. | 1,820 | 169.0 | 32.0 |
| Sulfur, wt. percent | 3.0 | 0.019 | 0.023 |
| 90% Pt, °F | 949 | 911 | 922 |
| Composition, vol. percent: | | | |
| Saturates | 28.2 | 53.1 | 47.0 |
| Olefins | 10.5 | 0 | 0 |
| Monocyclic, dicyclic aromatics | 34.0 | 42.5 | 45.7 |
| Tricyclic aromatics | 15.8 | 1.9 | 2.5 |
| Tetracyclic and heavier aromatics | 11.5 | 2.5 | 4.8 |

The superiority of the catalyst "B" for nitrogen removal is clear from Table V.

Cobalt molybdate on alumina catalysts were prepared as described in the following Examples 9, 10, 11 and 12. All these catalysts were sulfided before being used.

EXAMPLE 9

$Al_2O_3$ 85%; CoO 3%; $MoO_3$ 12%
(Dried alcoholate $Al_2O_3$)

900 grams spray-dried alcoholate alumina (66.7% solids), equivalent to 600 g. $Al_2O_3$ dry basis, were impregnated in a porcelain dish with a 1440 cc. mixed solution of 82.3 g. of B and A $Co(NO_3)_2 \cdot 6H_2O$ and 104 g. B and A $(NH_4)_6Mo_7O_{24} \cdot 4H_2O$ (81.5% $MoO_3$). These reagents were dissolved separately in distilled water, mixed and made up to volume cited. Impregnated material was dried in oven at 230° F. and mixed several times to assure as near a homogeneous mixture as possible. Yield was 913 g. There was no HF treatment of this catalyst and it shows up in Table VI as of lower activity than catalyst E–2 of Example 10. This catalyst is henceforth referred to as catalyst E–1.

EXAMPLE 10

$Al_2O_3$ 85%; CoO 3%; $MoO_3$ 12%
(HF hydrolyzed $Al_2O_3$)

3500 cc. of aluminum alcoholate (made from Pentasol) were added over a period of 1¼ hours, from a burette, to 4250 cc. of 1% HF aqueous solution (87 g. Baker's 49% HF to 4250 cc. volume) being stirred and contained in a rubber bucket. In Example 10, the catalyst (E–2) was formed from a wet alumina hydrosol by treatment with the aqueous HF treatment to form hydrogel particles. The hydrolyzed hydrogel alumina was filtered, dried at 220° F. for 16 hours, then at 500° F. for 6 hours. The alumina was then steamed 24 hours at 900° F. and finally heated at 1200° F. for 6 hours. The resulting alumina exhibited a surface area of 158 m.²/g., a pore volume of 0.62 cc./g. and a pore diameter of 157 A. It was impregnated with a mixed aqueous solution of 24.7 g. of B and A $Co(NO_3)_2 \cdot 6H_2O$ and 31.2 g. of B and A $(NH_4)_6Mo_7O_{24} \cdot 4H_2O$ (dissolved separately, then mixed to total volume 189 cc.), and dried at 220° F. for 16 hours. The yield was 231 g. This catalyst is henceforth referred to as catalyst E–2.

EXAMPLE 11

$Al_2O_3$ 85%; CoO 3%; $MoO_3$ 12%
(10% HF treated dried $Al_2O_3$)

595 g. of spray-dried alumina (made from aluminum alcoholate) of 67.3% solids content (equivalent to 400 g. $Al_2O_3$ on a dry basis) were impregnated in a rubber bucket with 1 liter of 4% HF aqueous solution, 10% HF dosage (prepared by making up 81.6 g. of Baker's 49% HF to 1 liter with water). After mixing well, the entire mass was dried in aluminum trays at 220° F. for 16 hours then heated at 500° F. for 6 hours after which it was steamed at 900° F. for 24 hours and finally heated at 1000° F. for 6 hours for a yield of 355 g. The resulting alumina exhibited a surface area of 191 m.²/g., a pore volume of 0.46 cc./g. and a pore diameter of 96 A. 343 g. (equivalent to 331 g. dry $Al_2O_3$) were impregnated with a mixed aqueous solution of 45.4 g. of B and A $Co(NO_3)_2 \cdot 6H_2O$ and 57.3 g. of B and A $(NH_4)_6Mo_7O_{24} \cdot 4H_2O$ (dissolved separately, then mixed to total volume 320 cc.), and dried at 220° F. for 16 hours. The yield was 447 g. This catalyst is heretofore designated as E–3.

EXAMPLE 12

$Al_2O_3$ 85%; CoO 3%; $MoO_3$ 12%
(20% HF treated dried $Al_2O_3$)

595 g. of spray-dried alumina (made from aluminum alcoholate) of 67.3% solids content (equivalent to 400 g. $Al_2O_3$ dry basis) were impregnated in a rubber bucket with 1 liter of an aqueous 8% HF solution, 20% HF dosage (prepared by making up 163.2 g. of Baker's 49% HF to 1 liter with water). After mixing well, the entire mass was dried in aluminum trays at 220° F. for 16 hours then heated at 500° F. for 6 hours after which it was steamed at 900° F. for 24 hours and finally heated at 1000° F. for 6 hours. 312 g. were recovered. The resulting alumina exhibited a surface area of 181 m.²/g., a pore volume of 0.44 cc./g. and a pore diameter of 97 A. 300 g. (equivalent to 281 g. dry $Al_2O_3$) were impregnated with a mixed aqueous solution of 38.5 g. of B and A $Co(NO_3)_2 \cdot 6H_2O$ and 48.7 g. of B and A $(NH_4)_6Mo_7O_{24} \cdot 4H_2O$ (dissolved separately, then mixed to total volume 310 cc.), and dried at 220° F. for 16 hours. The yield was 377 g. This catalyst is henceforth referred to as catalyst E–4.

Of this group of catalysts E–2 is the most active as will be shown by data in the following Table VI.

EXAMPLE 13

The following Table VI compares the activity of the catalysts described in Examples 9 through 12 with two conventional catalysts C–1 and C–2 for the denitrogenation of coker gas oil using the following reaction conditions.

The feed was a coker gas oil boiling in the range of 430–1100° F. and contained 0.34% by weight of nitrogen. The run conditions were 700° F., 1000 p.s.i.g., 1.0 v./v./hr. and 3000 s.c.f. $H_2$/barrel of feed. The run length was 3 hours and the total product collected and analyzed for nitrogen content by the Kjeldahl procedure. Catalyst C–1 was a conventional commercial catalyst containing on a weight basis 3.7% CoO, 13% $MoO_3$ and 81% $Al_2O_3$. Catalyst C–2 was a conventional commercial catalyst containing on a weight basis 3% CoO, 15% $MoO_3$, 4% $SiO_2$ and 78% $Al_2O_3$.

TABLE VI

| Catalyst | Percent nitrogen | |
|---|---|---|
| | Feed | Product |
| C–1 | 0.34 | 0.216 |
| C–2 | 0.34 | 0.210 |
| E–1 | 0.34 | 0.175 |
| E–2 | 0.34 | 0.145 |
| E 3 | 0.34 | 0.194 |
| E 4 | 0.34 | 0.223 |

The above data show that the experimental cobalt molybdate catalysts prepared from spray dried alcoholate alumina (E–1) and HF hydrolyzed alcoholate alumina hydrosol (E–2) are appreciably more active than the commercially available catalysts, C–1 and C–2. The data further show that HF treating the dried alcoholate alumina support has a deleterious effect on catalyst activity (E–3 and E–4). Consequently, HF setting the alcoholate alumina hydrosol is a vital step to achieving high catalyst activity.

EXAMPLE 14

A series of nickel-molybdena on alumina catalysts were obtained from the same commercial source as was catalyst C–1 described above. The chemical composition of these catalysts designated C–3 Ni through C–8 Ni are given in Table VII. Screening tests were performed on the catalysts using the same coker gas oil feed and conditions described in Example 14. Table VII compares the activity of these catalysts for hydrodenitrogenation.

TABLE VII

| Catalyst | Composition, wt. percent (Feed 0.34 wt. percent N) | | | | | Percent nitrogen in product |
|---|---|---|---|---|---|---|
| | CoO | NiO | $MoO_3$ | $Al_2O_3$ | $SiO_2$ | |
| C–1 | 3.7 | | 13 | 81 | | 0.216 |
| C–2 | 3 | | 15 | 78 | 4 | 0.210 |
| C–3-Ni | | 9.0 | 19.0 | 68.9 | | 0.214 |
| C–4-Ni | | 10.7 | 19.9 | 63.7 | 4.0 | 0.163 |
| C–5-Ni | | 10.6 | 20.5 | 57.6 | 10.0 | 0.171 |
| C–6-Ni | | 10.4 | 20.1 | 48.1 | 20.0 | 0.208 |
| C–7-Ni | | 9.9 | 20.0 | 40.0 | 28.0 | 0.206 |
| C–8-Ni | | 10.7 | 22.0 | 26.0 | 48.3 | 0.204 |

Catalyst C-3-Ni is no more active than catalyst C-1. Consequently substituting nickel for cobalt and increasing the concentration of metal oxides did not increase the catalyst activity for hydrodenitrogenation. The data do show, however, that incorporating 4 to 10% silica into the catalyst as in C-4-Ni and C-5-Ni maxamizes the activity of the nickel-molybdenum catalyst. C-4-Ni and C-5-Ni are significantly more active than either C-1 or C-2 but not as active as catalysts "A" and "B" of the present invention. Incorporating larger amounts of silica decreases the activity.

EXAMPLE 15

A comparison was made between four catalysts. Two of the catalysts made by the process of the present invention were the nickel molybdate catalyst "A" described in Example 1 and the cobalt molybdate catalyst E-2 described in Example 10. The other two catalysts were the nickel molybdate, C-4-Ni of Table VII, and cobalt molybdate (C-2) described in Table VII. These four catalysts were tested in a 650-hour side by side comparison using 430–850° F. coker gas oil described in Table VIII.

Table VIII

| Feed | |
|---|---|
| | (¹) |
| Gravity, ° API | 19.0 |
| Pour point, ° F. | 30 |
| Viscosity, cs. | 45 |
| Sulfur, p.p.m. | 30,300 |
| Nitrogen, p.p.m. | 725 |
| Distillation: | |
| 430–650° F., vol. percent | 65 |
| 650–680° F., vol. percent | 35 |

¹ Coker gas oil blend.

Reaction conditions employed for this comparison were 640° F., 1500 p.s.i.g., 0.7 v./v./hr., 7000 s.c.f. $H_2$/bbl. The two catalysts of the present invention (catalysts "A" and E-2) were definitely superior to the standard catalysts. Catalyst C-4 which was the best catalyst of Group C-3 to C-8 of Table VII, failed to maintain its high initial activity which quickly fell below the activity of the standard commercial catalyst C-2. This is shown below with results given in Table IX for the last 200 hours of operation.

Table IX

| Catalyst: | Relative activity |
|---|---|
| C-2 | 1.0 |
| E-2 | 1.3 |
| C-4-Ni | 0.6 |
| A | 1.8 |

EXAMPLE 16

Additional tests were made using a blended feedstock. Catalyst "B" was compared to a conventional hydrofining catalyst as above described containing cobalt molybdate on silica stabilized alumina, catalyst C-2 of Example 14. The catalysts were presulfided by the procedure described in Example 3.

EXAMPLE 17

Catalyst "B" of the present invention was subjected to 712 hours of continuous hydrodenitrogenation of a coker gas oil blend boiling in the range of 400–760° F. (23% 400–750° F. and 77% 560–760° F.) containing 750 p.p.m. nitrogen. The catalyst was then subjected to regeneration for the removal of coke and again tested for hydrodenitrogenation activity. It was found that the catalyst could be regenerated and reused.

Regeneration of fouled catalyst "B" was accomplished by treating the catalyst with a mixture of 0.5% oxygen in nitrogen at 700° F. until oxygen breakthrough. Complete burn-off of carbon or coke was accomplished by raising the temperature in 50° F. increments to 900° F., increasing the oxygen in 0.5% increments in the nitrogen mixture to 3.0% and burning to total oxygen breakthrough in each instance. No flame front was observed during the regeneration. About 5 wt. percent sulfur and 13.5 wt. percent carbon were removed. There was substantially no loss of fluorine from the catalyst. Post regeneration catalyst activity was determined using the same oil feed. A comparison of the data obtained with fresh and regenerated catalyst shows that no activity was lost. Both the fresh and regenerated catalyst were presulfided by the procedure described in Example 3.

TABLE X

400–760° F. coker gas oil feed
630° F., 1,500 p.s.i.g., 0.7 v./v./hr., 8,000 s.c.f. $H_2$/bbl.
Feed nitrogen, 750 p.p.m.

| | Nitrogen in product, p.p.m. | | | | | | | |
|---|---|---|---|---|---|---|---|---|
| Catalyst age, hours | 20 | 110 | 210 | 310 | 430 | 520 | 640 | 712 |
| Fresh catalyst | 6 | 6 | 2 | 14 | 18 | 24 | 18 | 14 |
| Regenerated catalyst | 10 | 5 | 9 | 16 | 16 | | | |

Example 17 shows that the catalyst can be regenerated and used again for removing nitrogen from oils The catalyst of the present invention was also compared to commercial cobalt molybdate on alumina in the removal of nitrogen from 70% overhead shale oil distillate. The conditions for the test were standardized at 800° F., 800 p.s.i.g., 5000 ft.³/b. of $H_2$ and a space velocity of 1 w./hr./w. The commercial catalyst was taken as the base case.

Both catalysts were presulfided with a thiophene-n-heptane (3.2% S) solution, at 550–600° F., 100 p.s.i.g., 6000 ft.³/b. of $H_2$, 3.8 w./hr./w. for 3 hours.

Equipment.—The tests were made using a continuous downflow packed bed reactor, 1⅛" in diameter and 12" long. Shale oil was fed from blow cases to a pump which was used both to pressure up and meter the oil to the reactor. Hydrogen was fed to the reactor from pressurized bottles through a regulator and was metered through a rotameter. The oil and the hydrogen were mixed in a T and preheated together before introduction into the reactor. The processed oil and gases from the reactor were cooled by a hot-water condenser which was followed by a Mity-Mite used to regulate their pressure in the reactor. The product was then separated in a high pressure separator. The gases from the separator were scrubbed and saturated with water before metering with a displacement gas meter. Gas samples for analyses by mass spectrometry were taken after the gas meter and the balance of the gases were vented. The liquid product was withdrawn periodically from the separator and weighed.

Procedure.—The standard running procedure first involved charging the catalyst to the reactor and pressure testing the high pressure sections of the unit. The inert gas used for the pressure test was then purged with hydrogen at the run pressure. The oil was turned in, marking the start of the run. One hour and two hour cuts were taken during the run with occasional "snap" gas samples for material balance periods. The liquid product was analyzed for nitrogen by a special Kjeldahl procedure and for sulfur by a gravimetric Dietert method. The gas was analyzed by mass spectrometry. The shut-down procedure involved a purge with a high flow rate of hydrogen, followed by a nitrogen purge. The spent catalyst was submitted for analysis of carbon on catalyst.

Feed inspections

| Feed, percent | ² 70 |
|---|---|
| Gravity, ° API | 22.8 |
| Nitrogen, wt. percent | 1.75 |
| Sulfur, wt. percent | 0.86 |
| Distillation for the 70% overhead cut: | |
| Init. | 428 |
| 5 | 458 |
| 10 | 481 |
| 20 | 552 |

Distillation for the 70% overhead cut—Contd.
```
30 _____ 602
40 _____ 665
50 _____ 738
60 _____ 785
70 _____ 835
80 _____ 875
90 _____ 927
95 _____ 975
```
² Overhead cut.

The commercial cobalt molybdate had a bulk density of 0.67 gm./cc. and contained 3.9% CoO, 12.9% $MoO_3$ and 83.2% $Al_2O_3$.

The nickel molybdate of the present invention substantially that designated catalyst "B" above, had a bulk density of 1.0 gm./cc.

The data resulting from the comparison are set forth in the following Table XI:

The silica hydrosol is not to be restricted to one made by the cation exchange method as silica hydrosols relatively free of alkali metals made in other ways, may be used.

The amount of HF used may be varied between about 0.01 and 0.1 gram of HF to 1 gram of alumina support or 1 gram of silica-alumina support. A 1.0 to 25% HF solution may be used in treating the hydrosol to form the hydrogel in the catalyst support.

The greater the cracking activity of the catalyst support, the greater is the nitrogen removal.

Thus it has been shown that the catalysts of this invention are superior to conventional supported nickel or cobalt molybdate catalysts for the denitrogenation of petroleum gas oil and shale oil.

What is claimed is:

1. A process for removing nitrogen compounds from hydrocarbon oils which comprises contacting the hydro-

TABLE XI

| | Feedstock | | | | | |
|---|---|---|---|---|---|---|
| | 70% overhead shale oil | | | | | |
| Catalyst | ⅛″ pill $CoMoO_4$-$Al_2O_3$ | | | ¼″ pill $NiMoO_4$-$Al_2O_3$-$SiO_2$-HF | | |
| Hours on feed | 9–10 | 15–16 | 17–18 | 9–10 | 15–16 | 17–18 |
| Temp., °F | 800 | 800 | 800 | 800 | 800 | 800 |
| Press., p.s.i.g | 800 | 800 | 800 | 800 | 800 | 800 |
| W./hr./w | 0.94 | 0.74 | 0.94 | 0.8 | 1.0 | 1.0 |
| H₂ rate s.c.f./b | 5,300 | 6,700 | 5,300 | 6,200 | 5,000 | 5,000 |
| Weight of catalyst, gm | 50 | 50 | 50 | 50 | 50 | 50 |
| Coke yield, wt. percent | 0.59 | 0.59 | 0.59 | 0.48 | 0.48 | 0.48 |
| Gas yield (total) wt. percent | 12 | | 19 | 12.0 | | 6.8 |
| Liquid product C₇⁺ Yield, wt. percent | 87 | 88 | 81 | 80 | 82 | 91 |
| Nitrogen, wt. percent | 0.32 | 0.48 | 0.46 | 0.32 | 0.29 | 0.37 |
| Sulfur, wt. percent | .04 | .02 | | | | 0.09 |
| Material balance | 99 | | 100 | 92 | | 98 |

From the above, it will be seen that the catalyst made by the process of the present invention has twice the volumetric activity as the commercial cobalt molybdate catalyst.

The space velocity of the oil feed may vary between 0.1 and 5 v./v./hr., the temperature during treatment may be between 550° F. and 850° F. and the pressure between about 500 and 5000 p.s.i.g. The amount of hydrogen or hydrogen-containing gas may be between 1,000 and 10,000 s.c.f./b. of oil feed.

Other salts of nickel and cobalt may be used such as the acetates but the nitrates are preferred. Ammonium paramolybdate is preferred for catalyst preparation because of its high solubility in water.

In one catalyst the NiO may be between about 1 and 15 wt. percent, the $MoO_3$ may be between about 10 and 30 wt. percent, the $Al_2O_3$ may be between about 50 and 85 wt. percent, the $SiO_2$ between about 1 and 10 wt. percent and the HF between about 0.10 and 10.0 wt. percent. In the catalyst without any silica in the support and using only alumina such as that made from an aluminum alcoholate, the proportions of the nickel oxide, molybdenum oxide and HF are substantially the same but the proportion of the alumina is increased to about 65 to 90 wt. percent.

In the catalyst made with cobalt, the CoO may be between about 1.0 and 10 wt. percent, the $MoO_3$ may be between about 10 to 30 wt. percent, the $Al_2O_3$ may be between about 50 and 90 wt. percent, the $SiO_2$ may be between about 1.0 and 10 wt. percent and the HF between about 0.10 and 10.0 wt. percent. In the catalyst without any silica in the support and using a high quality alumina such as one formed from an aluminum alcoholate, the proportions of the CoO, $MoO_3$ and HF are substantially the same but the proportion of the alumina is increased to about 65 to 90 wt. percent.

The alumina is not to be restricted to alumina made from an aluminum alcoholate as any other high quality or substantially pure alumina which is soluble in water may be used.

carbon oil at a temperature in the range of from 550° F. to 850° F., at a pressure in the range from 500 to 5000 p.s.i.g., at a liquid space velocity between 0.1 and 5.0 v./v./hr. together with 1000 to 10,000 s.c.f. of $H_2$ per barrel of the oil feed with a sulfided molybdate catalyst selected from the group consisting of nickel molybdate catalyst and cobalt molybdate catalyst on a support selected from the group consisting of HF treated alumina and HF treated silica stabilized alumina support, said catalyst being prepared by setting a hydrosol selected from the group consisting of alumina hydrosol and a mixture of alumina hydrosol and silica hydrosol to a hydrogel with a weak aqueous hydrogen fluoride solution, drying said hydrogel, impregnating said dried gel with an aqueous solution of compounds selected from the one group consisting of nickel and molybdenum compounds and from the other group consisting of cobalt and molybdenum compounds, drying and calcining said impregnated gel to produce a catalyst containing hydrogen fluoride and nickel or cobalt molybdate on alumina, or nickel or cobalt molybdate on silica stabilized alumina, and then sulfiding the catalyst to convert the oxides substantially all to sulfides.

2. A process according to claim 1 wherein the catalyst contains, in terms of equivalent metal oxides, between about 1 and 15 weight percent of NiO, between about 10 and 30 weight percent of $MoO_3$, between about 50 and 85 weight percent of $Al_2O_3$, between about 1 and 10 weight percent of $SiO_2$ and between about 0.10 and 10.0 weight percent of HF.

3. A process according to claim 2 wherein said hydrocarbon feed consists essentially of shale oil distillate.

4. A process according to claim 1 wherein said catalyst contains, in terms of equivalent metal oxides, about 1.0 to 10 weight percent of CoO, between about 10 and 30 weight percent of $MoO_3$, between about 50 and 90 weight percent of $Al_2O_3$ and between about 0.10 and 10.0 weight percent of HF.

5. A process for removing nitrogen compounds from hydrocarbon oils which comprises contacting the hydrocarbon oil at a temperature between about 550° and 850°

F., at a pressure between about 500 and 5000 p.s.i.g., at a liquid space velocity between about 0.1 and 5.0 v./v./hr., together with 1000 to 10,000 s.c.f. H₂ per barrel of the oil feed, with a catalyst comprising (a) an oxide or sulfide of cobalt or nickel and (b) an oxide or sulfide of molybdenum on an alumina or alumina-silica support, said catalyst being formed by a process comprising setting an alumina or alumina-silica hydrosol to the corresponding hydrogel with weak aqueous hydrogen fluoride solution, drying the hydrogel, impregnating the dried hydrogel with a cobalt or nickel compound and a molybdenum compound in aqueous solution, drying and calcining the impregnated gel to form said catalyst.

6. A process according to claim 5 in which said hydrogen fluoride solution contains about 1 to 25 percent by weight of HF.

7. A process for removing nitrogen compounds from hydrocarbon oils which comprises contacting the hydrocarbon oil at a temperature in the range of from 550° to 850° F., at a pressure in the range from 500 to 5000 p.s.i.g., at a liquid space velocity between 0.1 and 5.0 v./v./hr. together with 1000 to 10,000 s.c.f. of H₂ per barrel of the oil feed with a molybdate catalyst selected from the group consisting of nickel molybdate catalyst and cobalt molybdate catalyst on a support selected from the group consisting of HF treated alumina and HF treated silica stabilized alumina support, said catalyst being prepared by setting a hydrosol selected from the group consisting of alumina hydrosol and a mixture of alumina hydrosol and silica hydrosol to a hydrogel with a weak aqueous hydrogen fluoride solution, drying said hydrogel, impregnating said dried gel with an aqueous solution of compounds selected from the one group consisting of nickel and molybdenum compounds and from the other group consisting of cobalt and molybdenum compounds, drying and calcining said impregnated gel to produce said catalyst.

8. A process for preparing a catalyst which comprises setting a hydrosol selected from the group consisting of alumina hydrosol and silica-alumina hydrosol to a hydrogel with a weak aqueous hydrogen fluoride, drying said hydrogel impregnating said dried gel with an aqueous solution of compounds from the one group consisting of nickel and molybdenum compounds and from the other group consisting of cobalt and molybdenum compounds, drying and calcining said impregnated gel to produce a catalyst containing nickel or cobalt molybdate on alumina or nickel or cobalt molybdate on silica stabilized alumina.

9. A process for preparing a cobalt molybdate catalyst on an HF treated alumina support, said catalyst containing between about 1.0 and 10 weight percent of CoO, between about 10 and 30 weight percent of MoO₃ and between about 50 and 90 weight percent of Al₂O₃, and between about 0.10 and 10.0 weight percent of HF, said catalyst being prepared by setting an alumina hydrosol to a hydrogel with 1.0 to 25 weight percent aqueous hydrogen fluoride solution in an amount between about 0.1 and 1.0 pound of said hydrogen fluoride solution per pound of alumina in said hydrogel, drying said hydrogel, impregnating said dried gel with an aqueous solution containing cobalt and molybdenum compounds, drying and calcining said impregnated gel to produce a catalyst containing hydrogen fluoride and cobalt molybdate on alumina and sulfiding the catalyst to convert the cobalt and molybdenum oxides substantially all to sulfides.

10. A process for preparing a nickel molybdate catalyst on an HF silica stabilized alumina support, said catalyst containing between about 1 and 15 weight percent of NiO, between about 10 and 30 weight percent of MoO₂, between about 50 and 85 weight percent of Al₂O₃, between about 1 and 10 weight percent of SiO₂ and between about 0.10 and 10.0 weight percent of HF, said catalyst being prepared by mixing a major proportion of an alumina hydrosol and a minor proportion of silica hydrosol, setting the hydrosol mixture to a hydrogel with 1.0 to 25 weight percent aqueous hydrogen fluoride solution in an amount between about 0.1 and 1.0 pound of said hydrogen fluoride solution per pound of silica and said alumina in said hydrogel, drying said hydrogel, impregnating said dried gel with an aqueous solution containing nickel and molybdenum compounds, drying and calcining said impregnated gel to produce a catalyst containing hydrogen fluoride and nickel molybdate on silica stabilized alumina and sulfiding the catalyst to convert the nickel and molybdenum oxides substantially all to sulfides.

11. A process for preparing a catalyst which comprises setting a hydrosol selected from the group consisting of alumina hydrosol and silica-alumina hydrosol to a hydrogel with a weak aqueous hydrogen fluoride, drying said hydrogel, impregnating said dried gel with an aqueous solution of compounds from the one group consisting of nickel and molybdenum compounds and from the other group consisting of cobalt and molybdenum compounds, drying and calcining said impregntaed gel to produce a catalyst containing hydrogen fluoride and containing nickel or cobalt molybdate on alumina or on silica stabilized alumina and then sulfiding the catalyst to convert the oxides substantially all to sulfides.

References Cited

UNITED STATES PATENTS

| | | | |
|---|---|---|---|
| 3,105,813 | 10/1963 | Gutberlet | 208—254 |
| 3,291,721 | 12/1966 | Schuman | 208—254 |
| 3,322,666 | 5/1967 | Beuther et al. | 208—254 |

FOREIGN PATENTS 229,933  8/1958  Australia.

DELBERT E. GANTZ, *Primary Examiner.*

G. J. CRASANAKIS, *Assistant Examiner.*

U.S. Cl. X.R.

252—453, 458, 459